(12) United States Patent
Einfinger (10) Patent No.: US 8,577,571 B2
(45) Date of Patent: Nov. 5, 2013

(54) CLUTCH PRESSURE CONTROL DEVICE

(75) Inventor: Olivier Einfinger, Brugge (BE)

(73) Assignee: Hoerbiger Antriebstechnik GmbH, Loppem (BE)

( * ) Notice: Subject to any disclaimer, the term of this patent is extended or adjusted under 35 U.S.C. 154(b) by 0 days.

(21) Appl. No.: 13/259,434

(22) PCT Filed: Mar. 29, 2010
(Under 37 CFR 1.47)

(86) PCT No.: PCT/EP2010/001975
§ 371 (c)(1),
(2), (4) Date: Apr. 20, 2012

(87) PCT Pub. No.: WO2010/124774
PCT Pub. Date: Nov. 4, 2010

(65) Prior Publication Data
US 2012/0232766 A1    Sep. 13, 2012

(30) Foreign Application Priority Data

Mar. 27, 2009   (EP) ..................................... 09004468

(51) Int. Cl.
*F16D 48/06*   (2006.01)
(52) U.S. Cl.
USPC .......................................................... 701/67
(58) Field of Classification Search
USPC .......................................................... 701/67
See application file for complete search history.

(56) References Cited

U.S. PATENT DOCUMENTS

| | | | |
|---|---|---|---|
| 5,082,096 A | * | 1/1992 | Yamashita et al. ............ 477/175 |
| 2002/0014958 A1 | * | 2/2002 | Inoue et al. .................... 340/453 |
| 2003/0116396 A1 | | 6/2003 | Kuhstrebe |
| 2004/0159523 A1 | | 8/2004 | Duan |

FOREIGN PATENT DOCUMENTS

| | | | |
|---|---|---|---|
| DE | 102006056515 | * | 6/2008 |
| DE | 102006056515 A1 | | 6/2008 |
| FR | 2828252 A | | 2/2003 |
| FR | 2828252 A1 | * | 2/2003 |
| WO | 200225130 A | | 3/2002 |
| WO | 200225131 A | | 3/2002 |
| WO | WO 0225130 A1 | * | 3/2002 |
| WO | WO 0225131 A1 | * | 3/2002 |

OTHER PUBLICATIONS

Extended Search Report dated Sep. 1, 2009.
International Search Report dated May 19, 2010.
International Preliminary Report on Patentability, dated Sep. 27, 2011.

* cited by examiner

*Primary Examiner* — Helal A Algahaim
*Assistant Examiner* — Yazan A Soofi
(74) *Attorney, Agent, or Firm* — Carlson, Gaskey & Olds, PC (57) ABSTRACT

A clutch pressure control device includes a request filter unit that calculates a target clutch pressure value from a requested clutch pressure value input in the request filter unit. A feedforward clutch pressure control model unit calculates, from the target clutch pressure value input by the request filter unit, a feedforward current value. A PID control unit calculates a feedback current value from a valve pressure target value for a hydraulic proportional valve controlling the clutch pressure and a feedback actual pressure value. A first calculation unit calculates a hydraulic proportional valve target current value from the input feedforward current value and the feedback current value. The device utilizes measurement methods to find values for a kisspoint pressure of the clutch, a preload pressure of the clutch, and a fill volume of the clutch.

4 Claims, 8 Drawing Sheets

CLUTCH PRESSURE CONTROL DEVICE

TECHNICAL FIELD

The invention concerns a clutch pressure control device.

BACKGROUND OF THE INVENTION

The clutches of double-clutch transmissions (DCT) require a pressure control for the hydraulic pressure of both clutches in order to meet different operating conditions.

There is a need to provide a clutch pressure control device that has an optimized control strategy for the hydraulic pressure of both clutches in a double-clutch transmission.

SUMMARY OF THE INVENTION

A control strategy controls hydraulic pressure of both clutches in a wet DCT. Strategy inputs include clutch pressures for both clutches as requested from higher level code. Strategy outputs are the target currents for proportional hydraulic valves used to control the clutch pressures. The target current has a feedforward part and a feedback part. For each software loop, the control strategy receives a new value for the requested pressures and uses these inputs to compute a new value for the target currents.

One of the innovative parts of the invention is that the feedforward part of the target current is calculated using a completely model based approach. All important steady state and dynamic influences of each important component (clutch, hydraulic proportional valve, and hydraulic resistances between proportional valve and clutch) are modelled and these models are used: 1) to calculate from the requested pressure an achievable target pressure, taking into account the limitations in the responsiveness of the system (the request filter); and 2) to calculate from the sequence of target pressures, the target current to realize these pressures in the clutch.

There are several advantages of the fully model based control strategy, as compared to other approaches. These advantages include, for example, flexibility, as the requested pressure can be what it may; or the requested pressure profile can also be what it may; the request filter will filter out what is not achievable and will generate an achievable target pressure. This makes hierarchical structured clutch control software possible. The higher level software (for Drive Away or Shifting) can be separated from the clutch control software. It also makes the control strategy ideal for change-of-mind situations or other situations in which the requested clutch pressure cannot be predicted up front.

Another advantage is reusability. The model is built up out of different blocks that interact with each other. This makes this approach ideal for development with a concurrent engineering approach. When a component (for example a coil of the hydraulic proportional valve) has to change during the development process, the only thing that must be done in the control strategy is retune/change the part of the model that represents that component. There is no need for a full retuning of the clutch pressure control strategy. Because of this, the control strategy is suitable for the development of systems with short time-to-market. For the same reason, the control strategy can also be easily re-used in related projects, provided that the amount of changes in mechanic/hydraulic parts is limited.

Another advantage is easy adaption. Because the control strategy is based on a model that is a good representation of reality, it is easier to cope with dispersion on the mechanic/hydraulic hardware. When a change in:

Preload pressure: the clutch pressure needed to overcome the preload on the springs between the clutch plates=the pressure at which the clutch piston starts to move in quasi steady-state situations. The highest pressure at which the clutch is fully open.

Kisspoint pressure: the pressure at which the clutch springs are that much compressed that the clutch plates make contact, in quasi steady-state situations. The pressure at which the clutch becomes closed.

Fill volume: the oil volume to add to the clutch to go from fully open (preload pressure) to fully closed (kisspoint pressure).

Current to force characteristic of the solenoid.

is detected via an adaption measurement or an End-Of-Line calibration, all that has to be done is to fill in the right value(s) in the appropriate part of the model. Especially in the early stage of a project with concurrent engineering, this is desirable. At that time, it is often not clear yet which parameters of the hardware will have significant dispersion and which not. Also, it is often not clear yet what the exact sensitivity of the system is towards the changes in these parameters. The fully model based approach models the influence of each hardware component separately and ensures that whatever parameter is changing, the control strategy will be able to cope with it for every possible situation.

Another advantage is that there is no need for transitions between different control strategies. Because the control strategy contains models from all relevant components, it can handle all situations. Other clutch pressure control strategies often have different modes to handle different type of situations with transitions between different modes. These transitions very often lead to degradation in control quality, especially in not so typical situations (situations for which the transition was not tuned).

Another advantage is that there is a very high performance quality of the feedforward control strategy. Despite the high non-linearities in the system dynamics, the quality of the feedforward part of the control strategy is very high. Therefore, a gain scheduled PID is enough to achieve an overall very good performance in clutch pressure control.

BRIEF DESCRIPTION OF THE DRAWINGS

Further features, details and advantages of the present invention will become apparent from the following description of the drawings, wherein.

DETAILED DESCRIPTION

Figure 1:
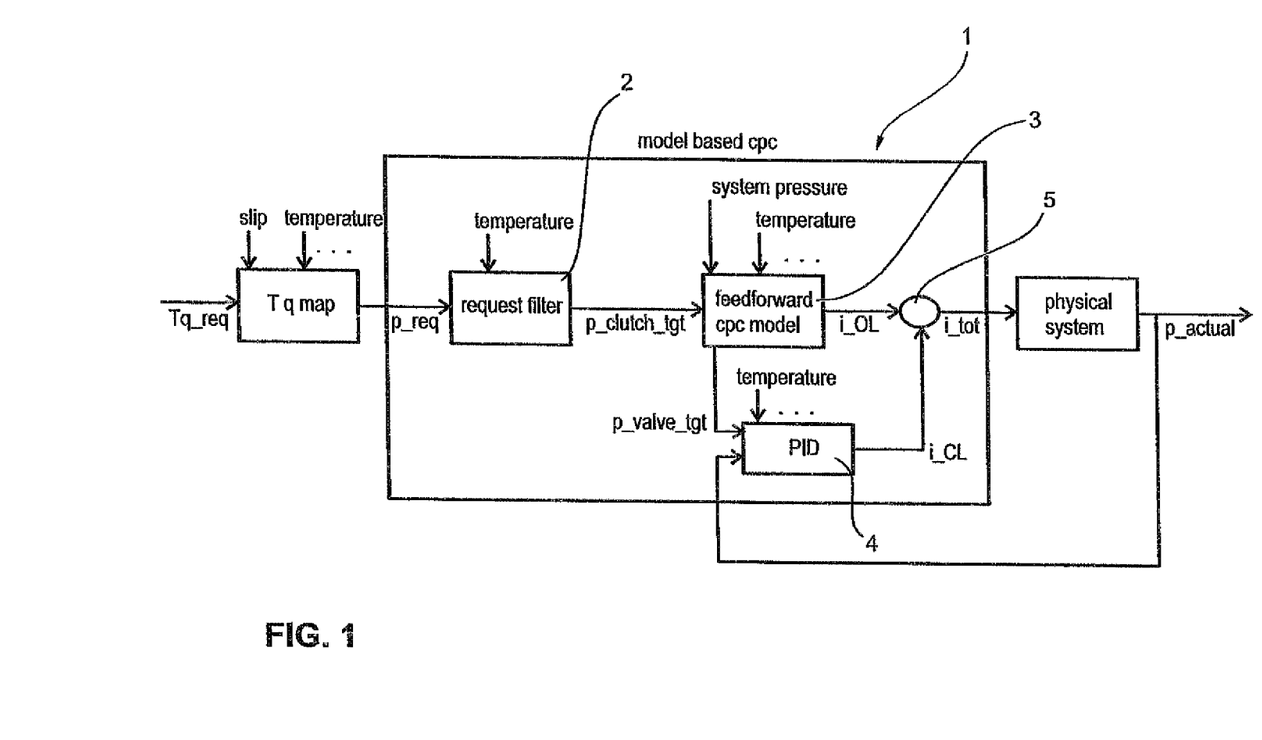
FIGS. 1 and 2 are block diagrams of a first embodiment of the present invention.

The following discusses an overview over the control strategy for the clutch pressure control device 1. The output of the control strategy is i_tot 5, which equals the target current for the hydraulic proportional valve that controls the clutch pressure. The i_tot 5 includes i_OL and i_CL. The i_OL is the feedforward part of the control strategy. The i_CL is the contribution of the gain scheduled PID 4 to the target current.

As can be seen from FIG. 1, the i_OL is calculated from the p_req (=the requested pressure for the clutch). For each software loop, a new p_req is entered in the control strategy and a new i_OL is calculated.

The calculation of i_OL takes place in two stages. The first stage is the calculation of p_clutch_tgt. The p_clutch_tgt is the target value for the clutch pressure. Since the p_req can be what it may, the request filter 2 has to ensure that the p_clutch_tgt is achievable. The second stage is the calculation of the i_OL from the p_clutch_tgt via the feedforward cpc model 3. Both the request filter and the feedforward cpc model are model based. The term "cpc" means "clutch pressure control".

Figure 2:
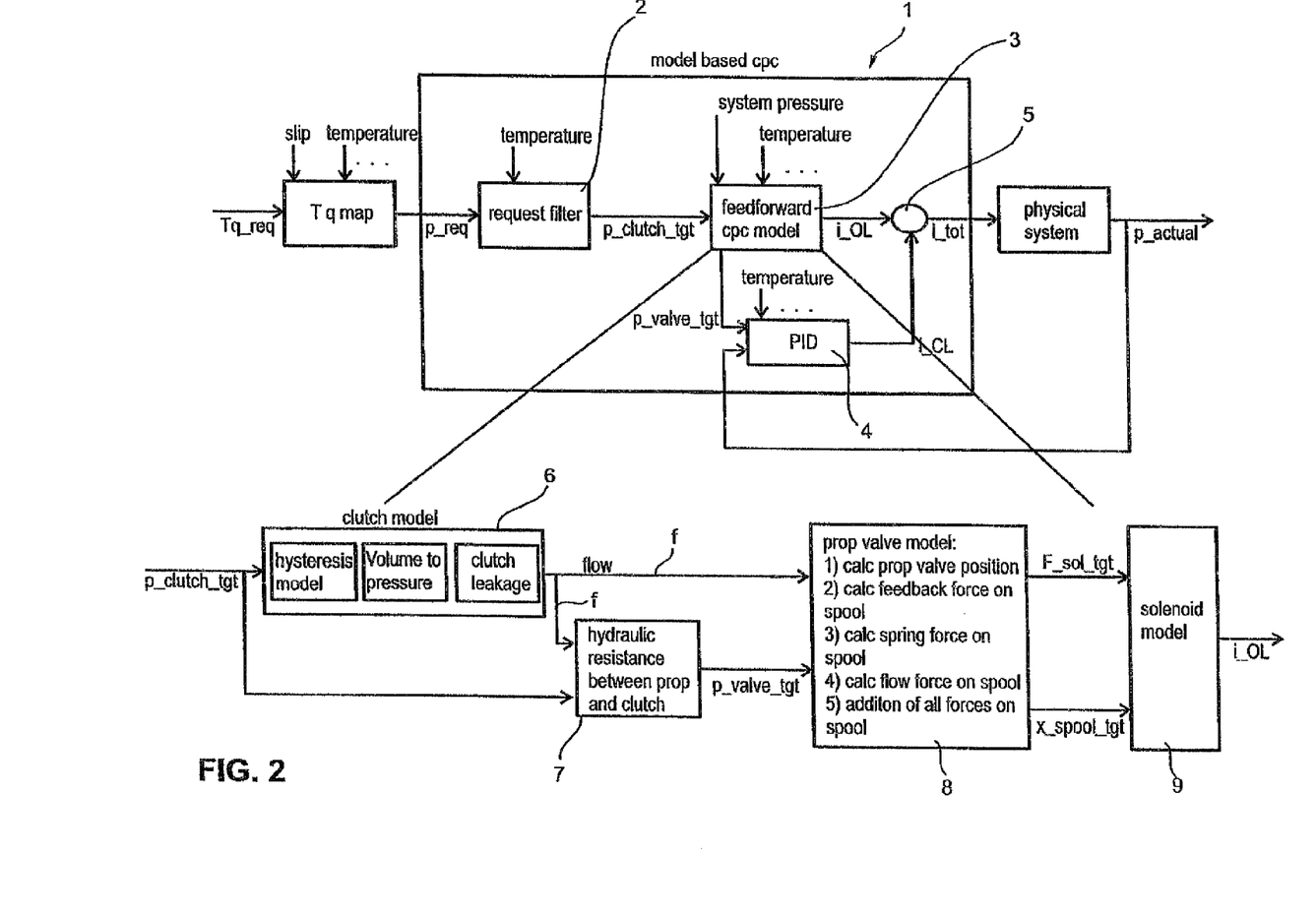
Figure 3:
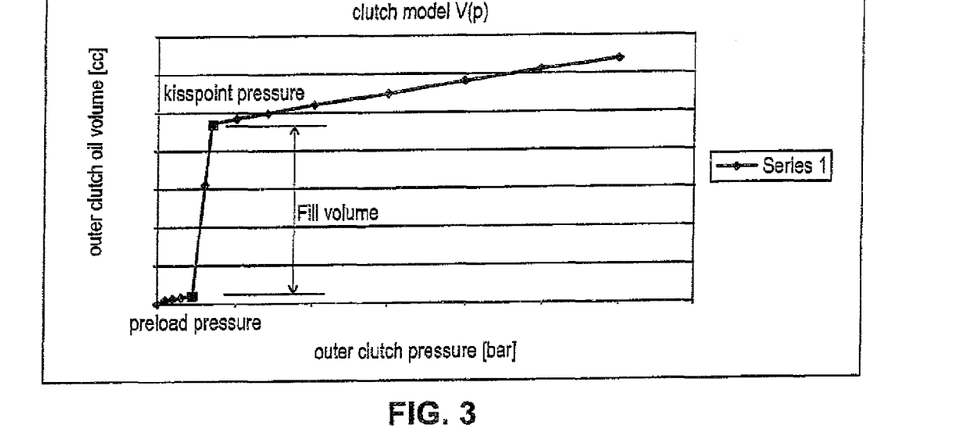
FIGS. 3 and 4 are graphs of the relation between clutch volume and clutch pressure.

Next, the calculation of feedforward target current from the target clutch pressure is discussed. The lower part of the FIG. 2 gives an overview over the main parts of the feedforward cpc model 3. In the first part, the clutch model 6 is used to calculate from the p_clutch_tgt, the flow that has to be sent to/drained from the clutch. For a certain operating point, the calculated flow is higher if the slope in p_clutch_tgt is higher. The clutch model includes:

A curve of clutch piston volume in function of clutch pressure. This curve looks essentially as shown in FIG. 3. The curve is parameterized with preload pressure, kisspoint pressure, and fill volume. This makes it possible to adapt the control strategy quite easily to the dispersion on the mechanical hardware which is very important from a controlling point of view. The curve is used to calculate the needed clutch flow:

$$\text{clutch flow} = \frac{d}{dt}(\text{Clutch volume}).$$

A clutch hysteresis model: a model of the hysteresis on the movement of the clutch piston. This takes into account that the clutch pressure—clutch volume curve looks in reality like shown in FIG. 4.

Figure 4:
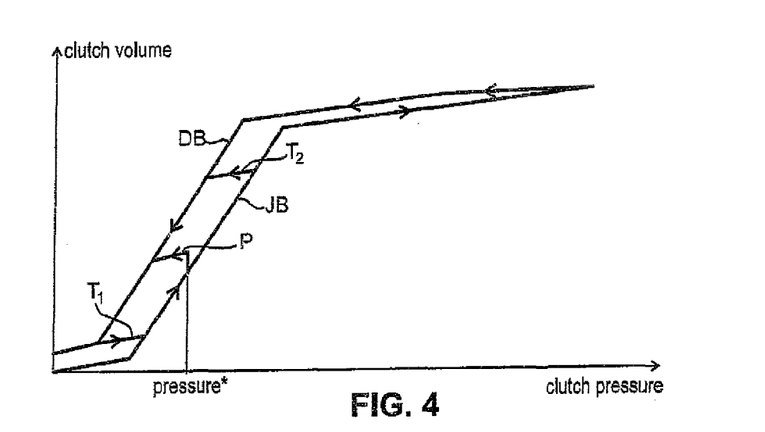

The two lines JB and DB are the two main hysteresis branches of the clutch. The right one is called the increasing branch JB, the left one the decreasing branch DB.

Two curves $T_1$, $T_2$ are the transitions between the two hysteresis branches. This happens when the slope in (target) pressure changes in sign. Notice that the curves $T_1$, $T_2$ have a constant slope.

The curve P: shows what happens with the hysteresis behavior when the pressure is kept constant for some time at pressure=pressure* on the increasing hysteresis branch and then is sloped down.

A model of the clutch leakage flow.

The second part 7 of the feedforward cpc model is the calculation of p_valve_tgt from the calculated flow and p_clutch_tgt. The p_valve_tgt is the target value for the pressure at the pressure sensor. In many designs, there can be a significant pressure drop between the clutch and the pressure sensor which makes this calculation needed. The model exists of some look-up tables which hold the information about the pressure drop in various situations (different flows, temperatures, . . . ): p_valve_tgt=p_clutch_tgt+f(clutch flow, oil temperature, . . . )

The third part of the feedforward cpc model is the proportional valve model. The following calculations take place:

Calculate the target pressure drop over the proportional valve

If there is a significant pressure drop between the pressure sensor and the hydraulic proportional valve, the pressure drop over this resistance is calculated based on the calculated clutch flow and the border conditions. Then the target pressure at the output of the proportional valve is calculated. This pressure is called the feedback pressure.

$p_{Feedback}=p\_\text{valve}\_tgt+\Delta p_{resistance}$(clutch flow, oil temperature)pressure drop over prop valve=$\Delta p$=line pressure−$p_{Feedback}$ Calculate from the target pressure drop and the target flow the target position of the proportional valve spool (x_spool_tgt). For turbulent flow through an orifice, the following can be used:

$$A(\text{x\_spool\_tgt}) = \frac{Q}{C_D} \cdot \sqrt{\frac{\rho}{2 \cdot \Delta p}}$$

with
$C_D$=contraction coefficient
$A$(x_spool_tgt)=the opening surface of the valve
x_spool_tgt=the position of the valve spool
Q=the flow through the valve
$\Delta p$=the pressure drop over the valve
$\rho$=oil density Calculate all forces that act on the proportional valve spool:
The spring force: $F_{spring}=F_0+k\cdot \text{x\_spool\_tgt}$
$F_0$=spring preload force
k=spring stiffness
x_spool_tgt=valve spool position
The flow force $F_{Flow}$
The pressure feedback force:
$F_{Feedback}=p_{feedback}\cdot A_{Feedback}$
$p_{Feedback}$=the pressure working on the feedback surface of the proportional valve
$A_{Feedback}$=feedback surface of the proportional valve
The damping force: $F_{damp}=c_{damp}$(oil temperature)$\cdot \dot{x}$
$c_{damp}$(oil temperature)=the damping coefficient for the valve spool in function of oil temperature
$\dot{x}$_spool_tgt=the speed of the valve spool
. . .
Add all these forces. The total force 'F_sol_tgt' is then the target force for the solenoid to deliver.

$F\_\text{sol}\_tgt=F_{spring}+F_{flow}+F_{Feedback}+F_{damp}+\ldots$

The output of the proportional valve model is a target force and target position for the solenoid 9: F_sol_tgt and x_spool_tgt.

The last part of the feedforward cpc model is the solenoid model. This model comprises:

A look-up table with
Input: target force and target position (with hysteresis correction)
Output: target current
i_FromLookUp=f(F_sol_tgt, x_spool_tgt)

A correction on the target current (mA to mA curve) based on adaption/calibration data from measuring current to clutch pressure curve.

A hysteresis model (similar to the one used for the clutch hysteresis)

Next, the calculation of the target clutch pressure from the requested clutch pressure is discussed. A big contributor to the quality of the clutch pressure control, is the request filter. The request filter calculates for each software loop a new target clutch pressure ('p_clutch_tgt') from the requested clutch pressure ('p_req'). The goal of the request filter is to generate the target pressures that are achievable and that correspond as much as possible with the requested pressure.

Figure 6:
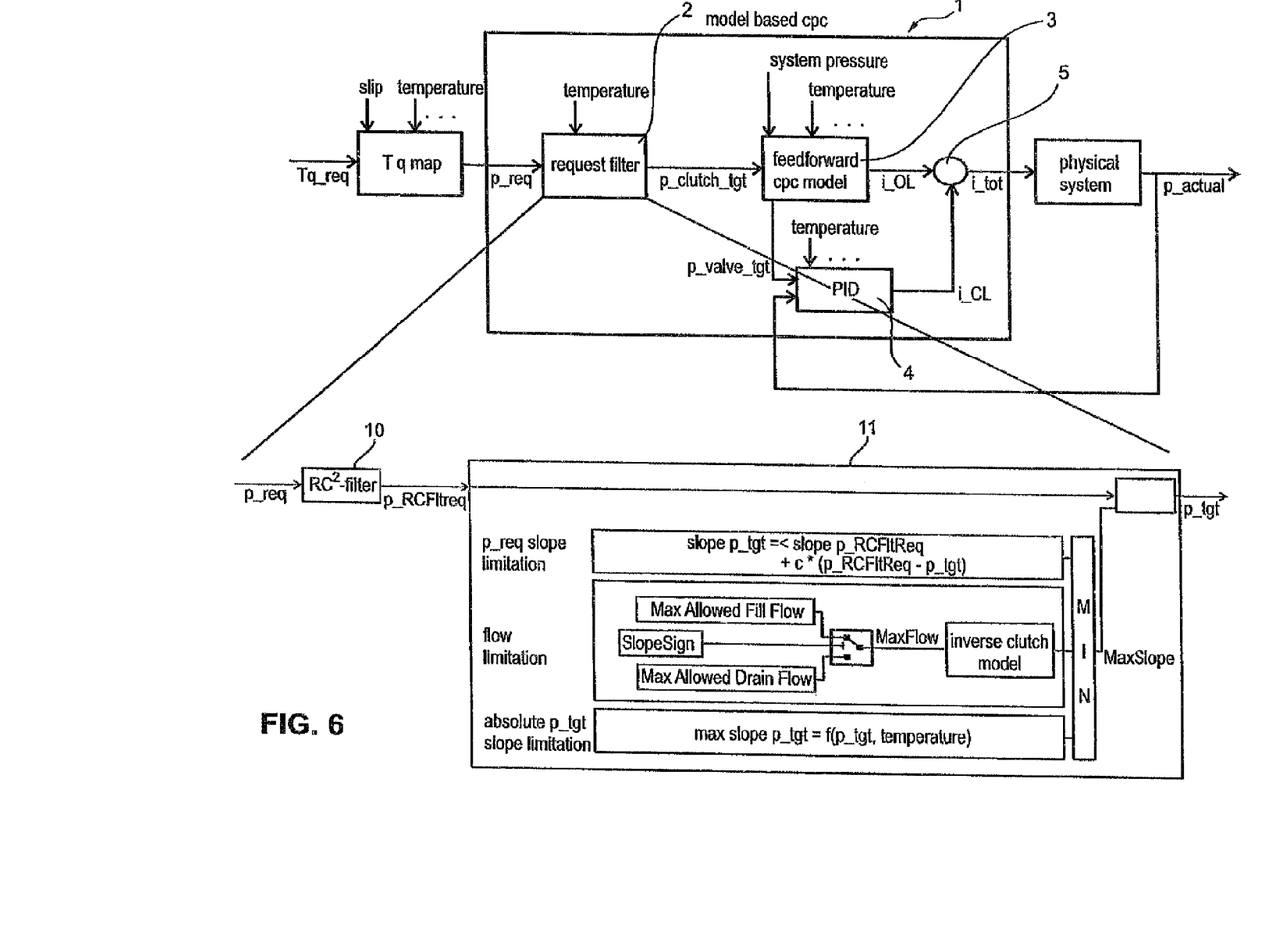
FIG. 6 is a third block diagram explaining the first embodiment of the present invention.

The request filter, as shown in FIG. 6, comprises:

A double RC-filter 10 (2 RC-filters in series). This filter has the purpose to make the target pressure smooth. This smoothness eventually results in a better control quality.

A slope filter 11. The purpose of this filter is to ensure that the target pressure does not change too fast. Therefore, different limitations on the slope of the p_clutch_tgt are calculated and the one that limits the slope the most, is taken into account:

p_req_slope limitation: This block ensures that the target pressure slope can only be much higher than the RC-filtered requested pressure slope when there is a big difference between both. This block ensures that, if there is a difference between target pressure and RC-filtered requested pressure, the target pressure smoothly catches up with the RC-filtered requested pressure again when it is allowed (other two p_tgt slope restrictions are less limiting).

Max $p\_clutch\_tgt$ slope=$p\_RcFltReq$ slope+$c*(p\_RcFltReq-p\_clutch\_tgt)$

Flow limitation. The following calculations take place in this block:

Calculation of SlopeSign=positive if new p_RCFltReq is higher than previous p_clutch_tgt. Otherwise negative The correct max allowed flow is selected based on SlopeSign. If SlopeSign is positive, the max allowed flow is the max allowed filling flow. Otherwise, it is the max allowed draining flow. About the calculation of these flows:

Max allowed filling flow: May not be higher than

The available flow (and some safety margin). The available flow is the pump flow minus the system oil leakage and the flow already used for other purposes (example: synchronizer movement).

A maximum flow that is allowed for controllability reasons. It is best to limit the flow to a certain level so that the filling is not performed too fast.

Max allowed draining flow: May not be higher than

The maximum possible draining flow. Depending on the geometry of the proportional valve and the pressure drop over the valve, there is a certain limit to the drain capacity of the valve. This can be taken into account here.

The maximum draining flow allowed for controllability reasons.

Absolute p_tgt slope limitation: based upon the responsiveness requirements, one can also limit the max p_tgt slope.

An inverse clutch model: This is the inverse version of the clutch model presented in ('Calculation of feedforward target current from target clutch pressure'): the outputs have become inputs and vice versa. The inverse clutch model is used to convert the flow limitations into limitations for the slope of the p_clutch_tgt.

Figure 7:
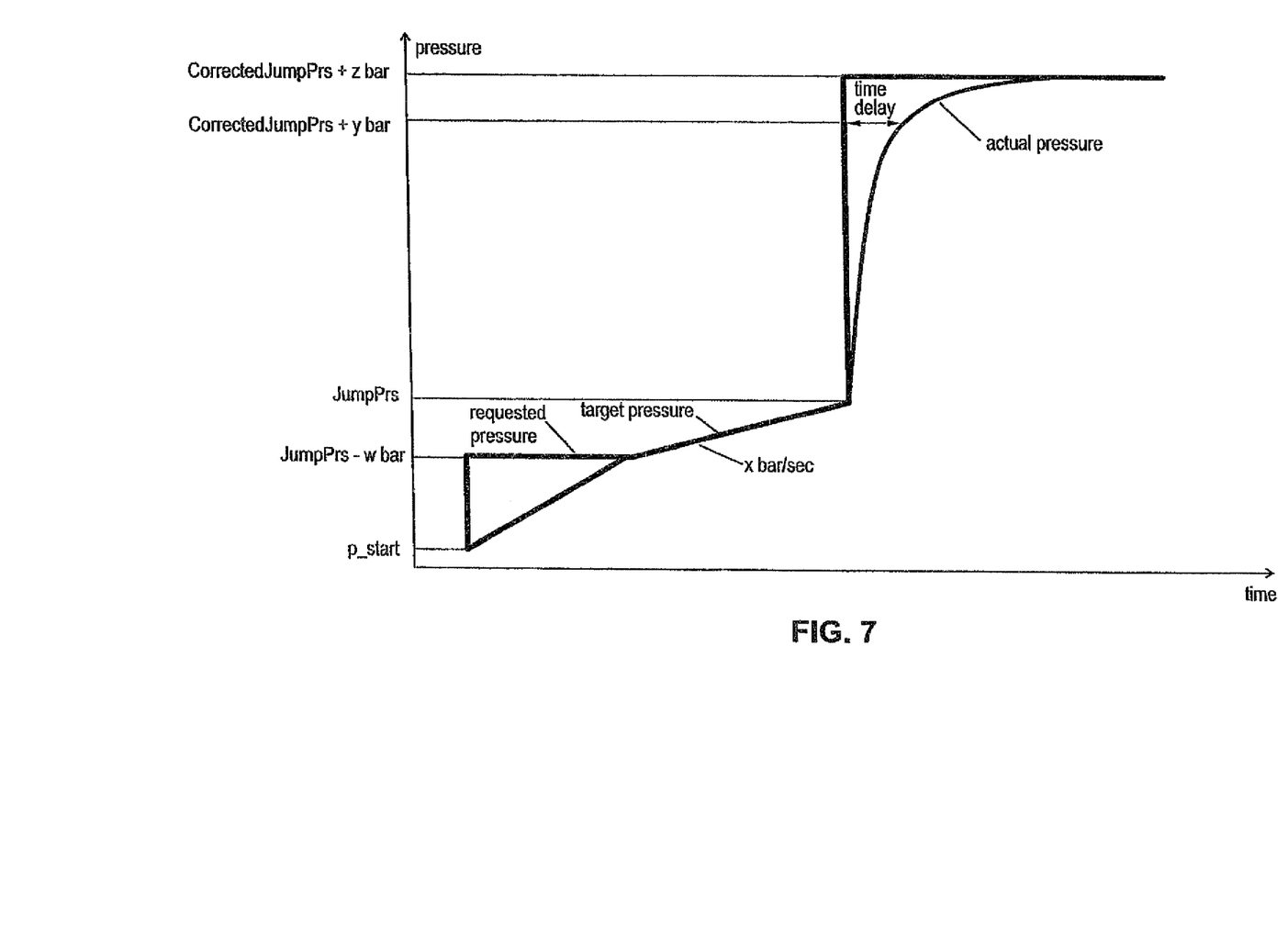
FIG. 7 is a graph of pressure over time during the kisspoint pressure adaption.

Next, the kisspoint pressure and preload pressure adaption strategy (FIGS. 7 and 8) is discussed. The aim is to estimate the kisspoint pressure on the increasing hysteresis branch of the clutch. The parameter of the adaption measurement is: JumpPrs. The following is a step by step description of the measurement:

The start is from a clutch pressure below preload pressure=p_start (clutch is open)

Next, a normal cpc is done, but without any flow compensation

Change the requested clutch pressure from p_start to 'JumpPrs−w bar'.

When the target pressure reaches 'JumpPrs−w bar', start increasing the requested pressure with x bar/sec until the 'JumpPrs' is reached.'

Without any flow compensation' means: calculate the feedforward part of the target current for the proportional valve from the steady state relation between clutch pressure and current Once the target clutch pressure has reached 'JumpPrs', the following steps occur:

Calculate JumpPrsCorrection=the average difference between the actual pressure and target pressure during the last samples Calculate CorrectedJumpPrs=JumpPrs+JumpPrsCorrection Change the requested pressure to CorrectedJumpPrs+z bar, with cpc without request filter and without any flow compensation and with keeping the closed loop correction on the same value Once the actual clutch pressure has reached CorrectedJumpPrs+y bar, switch back to normal cpc and go back to p_start (via 0 bar) to complete the cycle y has to be lower than z The result of the measurement is the time difference between The moment at which the requested pressure is set to CorrectedJumpPrs+z bar, and The moment at which the actual clutch pressure reaches CorrectedJumpPrs+y bar.

In essence, a pressure response is measured on a current step at a certain pressure level (=at a certain JumpPrs). The measured time delay will give information about the stiffness of the clutch at 'JumpPrs'. From this the kisspoint pressure can be derived. All the special measures described above contribute to the accuracy in the estimation of the kisspoint pressure. The correction on JumpPrs is performed so that an as good as possible estimation of the pressure can be achieved at which the current step response was measured. The target pressure profile before the jump in requested pressure to CorrectedJumpPrs+z bar is designed in such a way that the clutch pressure is on the increasing hysteresis branch at the moment of the jump.

Figure 9:
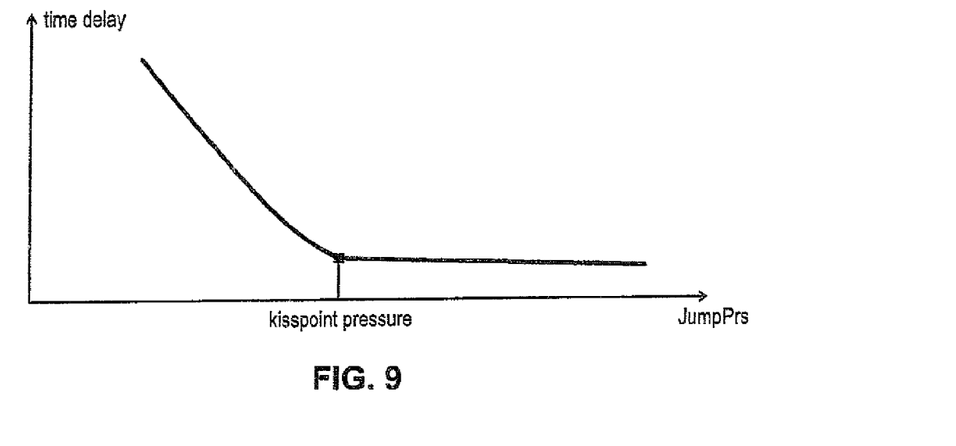
FIG. 9 is a graph showing the result of kisspoint pressure adaption measurements.

FIG. 9 shows the relation between the time delay and the JumpPrs for kisspoint pressure adaption measurements. The kisspoint pressure is the minimal pressure at which the pressure does not have a big influence on the time delay.

Figure 8:
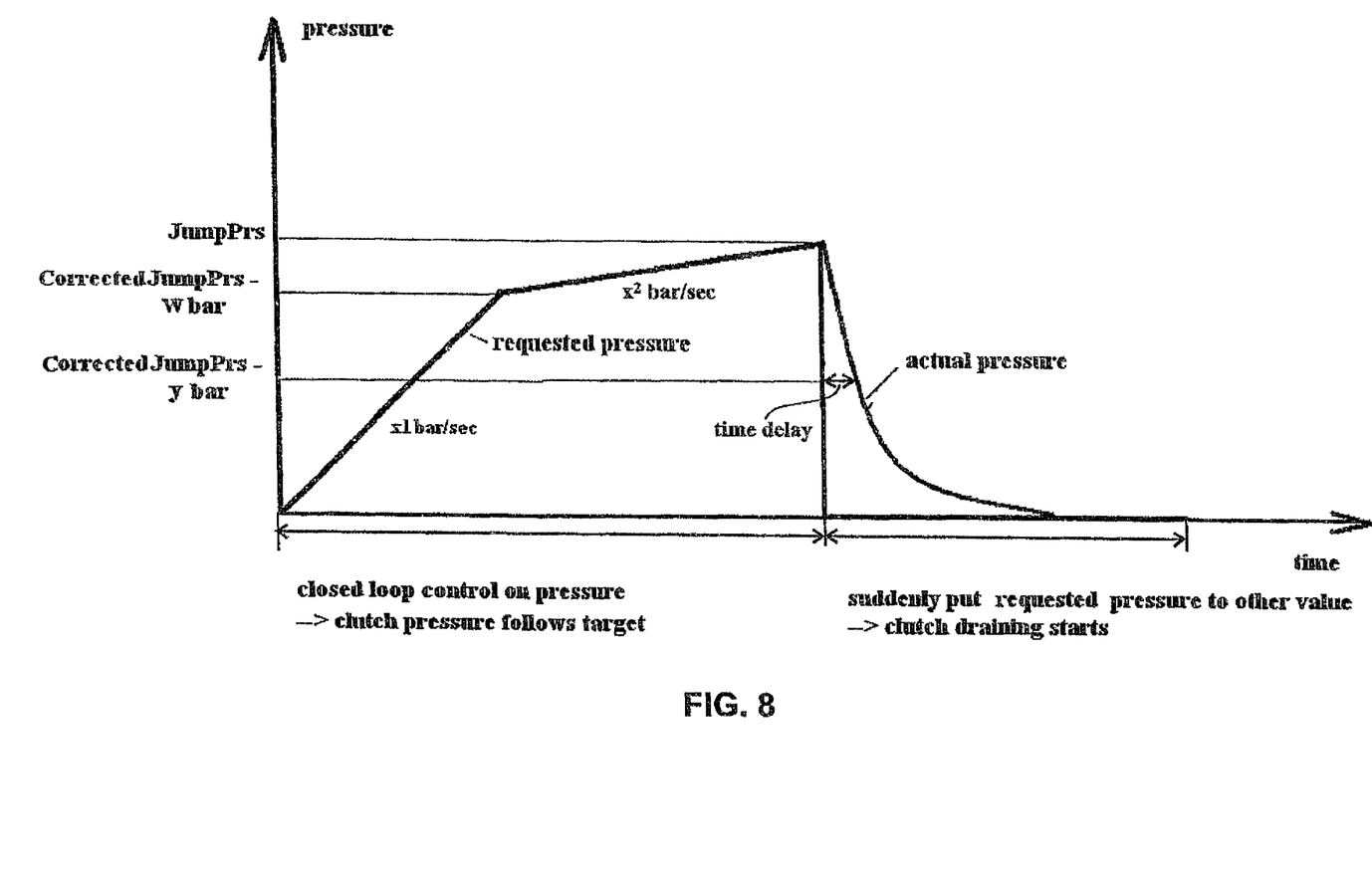
FIG. 8 is a graph of pressure over time during the preload pressure adaption.

The preload pressure adaption strategy is very similar. The aim here is to estimate the preload pressure on the increasing clutch hysteresis branch.

Figure 5:
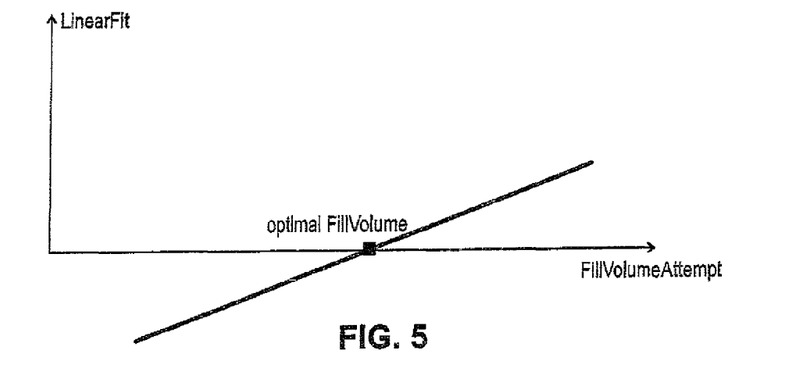
FIG. 5 is a graph showing the result of fill volume adaption measurements.
Figure 10:
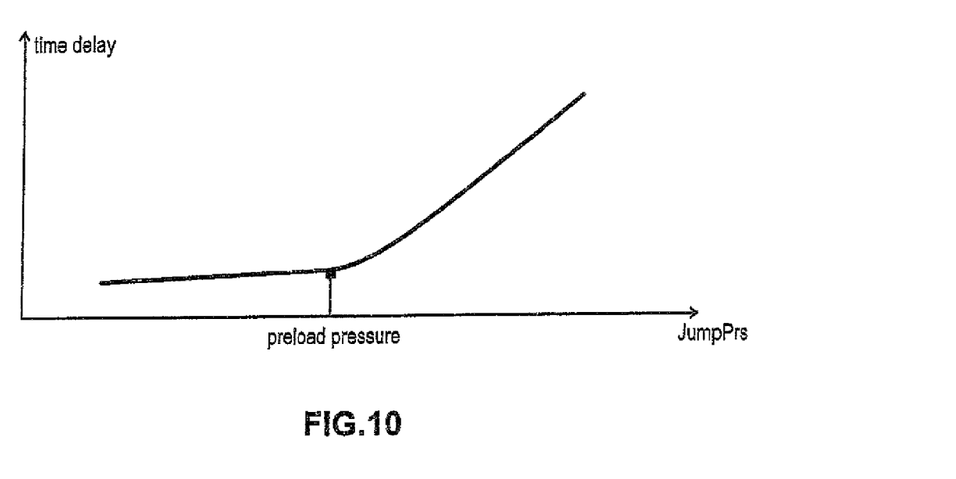
FIG. 10 is a graph showing the result of preload pressure adaption measurements.
Figure 11:
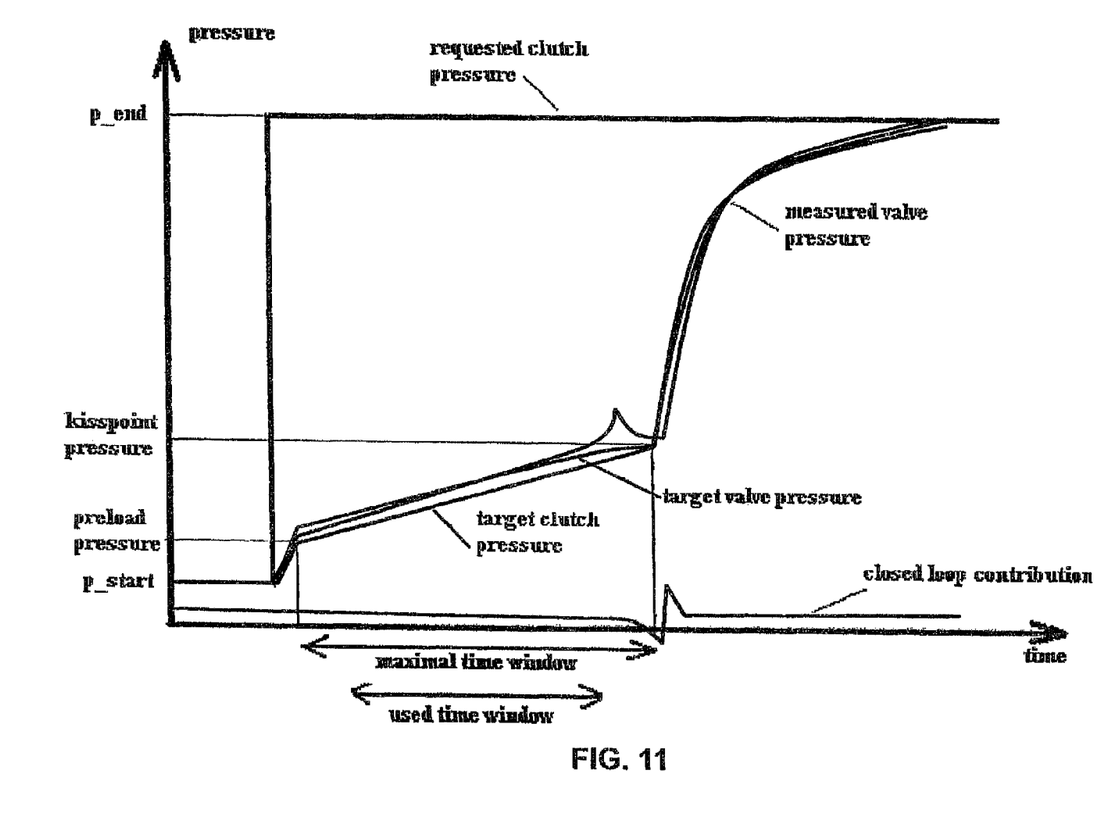
FIG. 11 is a sketch explaining a result of a slightly excess fill volume estimation during a fill volume adaption measurement.

FIG. 8 shows the measurement procedure. Differences with the kisspoint pressure adaption:
Step down in requested pressure/target current instead of step up
The y depends on how low the preload pressure can get. If the preload pressure can for example be around 1.5 bar, the y has to be lower than 1.5 bar.
FIG. 10 shows the relation between the time delay and the JumpPrs for preload pressure adaption measurements. The preload pressure is the maximal pressure at which the pressure does not have a big influence on the time delay.
The fill volume adaption strategy is discussed. The aim of this adaption measurement is to find the fill volume of the clutch. Because it is not possible to measure the clutch fill volume directly during the application, one should interpret this goal as: find that value for the fill volume that gives the best pressure control results, especially during clutch filling. The quality of the achieved clutch pressure control that results once this fill volume is determined, also depends on:
The accuracy of pressure measurement;
The accuracy of the steady state current to clutch pressure model; and
The accuracy of the model for all components that contribute to the current needed to have a certain pressure slope: modelled preload pressure, modelled kisspoint pressure, model of hydraulic resistances, model of flow forces acting on the proportional valve, . . . .
The fill volume adaption strategy assumes that all the above are modelled good enough and that the only parameter still to be adapted is the fill volume.
The parameter of the measurement is FillVolumeAttempt. FIG. 11 is a sketch of the result one can expect when the FillVolumeAttempt is a bit too high.
A step by step description of the measurement is:
The start is from a clutch pressure below the preload pressure=p_start
Next, the requested clutch pressure is set to a value above kisspoint pressure: p_end.
Because of the request filter, this step in requested pressure will result in a trajectory in target clutch pressure: a clutch filling will be performed and after the filling, the target clutch pressure will go to the requested pressure with an RC shaped curve.
Once the actual clutch pressure has reached kisspoint pressure+x bar, put the requested pressure back to p_start (via 0 bar) to complete the cycle
The result of the measurement is the 'measured valve pressure', 'target valve pressure,' and the 'closed loop contribution' in a certain time window of the measurement. Both signals have to be saved for further processing. The time window will be (a part of) the maximal time window, as shown in FIG. 11.
Processing of the measurement includes:
Calculate PressureDifference=(measured valve pressure−(closed loop contribution−closed loop contribution at p_start just before fill starts)−target valve pressure) for every point in the time window.
Calculate the least squares linear fit of that PressureDifference in the time window
Calculate LinearFit=the value of that linear fit at the end of that time window.
The optimal fill volume is that one for which the LinearFit is 0 bar.
The closed loop contributions in the above equations are expressed in a pressure scale, based upon the steady state pressure/current ratio. The measurement is performed with closed loop control to have a realistic filling as possible. In this way, one may be sure that the estimation for FillVolume will give good results for filling during the application. Notice that the closed loop influence on the adaption results is minimized by the definition of PressureDifference: If the measured pressure is for example 0.5 bar above the target even though the closed loop has decreased 1 bar since p_start, the resulting PressureDifference is 1.5 bar, which signals that the actual pressure is much higher than expected from the feedforward model. The closed loop may not be too noisy for this compensation to work well. The least squares linear fit in the calculations already has the target of filtering out the noise as much as possible The correction of the PID by CPC_ODD_PIDContrib@p_start is there to not take into account any offset mistakes in the steady state current to clutch pressure curve while optimizing the fill volume.
FIG. 5 shows the relation of LinearFit and FillVolumeAttempt for fill volume adaption measurements. The fill volume is the volume at which the LinearFit is 0 bar.
In addition to the written disclosure of the invention reference is herewith made explicitly to the illustration and explanation of the invention in FIGS. 1 to 11.
Concerning the design of a double clutch reference is made to EP 1 630 441 the disclosure of which is herewith incorporated by reference.
Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. Clutch pressure control device comprising:
 a model based request filter unit calculating a target clutch pressure value from a requested clutch pressure value input in the request filter unit;
 a completely model based feedforward clutch pressure control model unit calculating, from the target clutch pressure value input by the request filter unit, a feedforward current value; and
 a PID control unit calculating a feedback current value from a valve pressure target value for a hydraulic proportional valve controlling clutch pressure and a feedback actual pressure value;
 the feedforward clutch pressure control model unit comprising
  a clutch model unit for calculating, from the target clutch pressure value, a flow of hydraulic fluid to be sent to or to be drained from a clutch;
  a second calculation unit calculating the valve pressure target value from the calculated flow and the target clutch pressure value;
  a proportional valve model unit calculating a target force and a target position for a solenoid of a proportional valve from the flow and the valve pressure target value; and
  a solenoid model unit that outputs the feedforward current value.

2. The clutch pressure control device according to claim 1 comprising a first calculation unit calculating a hydraulic proportional valve target current value from the input feedforward current value and the feedback current value.

3. The clutch pressure control device according to claim 1 wherein the request filter unit comprises:
 a double RC-filter that filters out noise of the requested clutch pressure value and outputting a corresponding filtered pressure value; and a slope filter that avoids an unduly fast change of target pressure.

4. A clutch pressure control method of a clutch pressure control device for the adaption parameters in a request filter and a feedforward clutch pressure control model unit, the clutch pressure control device comprising:

a model based request filter unit calculating a target clutch pressure value from a requested clutch pressure value input in the request filter unit;

a completely model based feedforward clutch pressure control model unit calculating, from the target clutch pressure value input by the request filter unit, a feedforward current value; and a PID control unit calculating a feedback current value from a valve pressure target value for a hydraulic proportional valve controlling clutch pressure and a feedback actual pressure value;

the feedforward clutch pressure control model unit comprising a clutch model unit for calculating, from the target clutch pressure valve, a flow of hydraulic fluid to be sent to or to be drained from a clutch;

a second calculation unit calculating the valve pressure target value from the calculated flow and the target clutch pressure value;

a proportional valve model unit calculating a target force and a target position for a solenoid of a proportional valve from the flow and the valve pressure target value; and a solenoid model unit that outputs the feedforward current value;

the clutch pressure control method comprising the following method steps:

determining a value for a kisspoint pressure of a clutch;
determining a value for a preload pressure of the clutch, and
determining a value for a fill volume of the clutch to be used in the request filter and the feedforward clutch pressure control model unit.

* * * * *